(12) United States Patent
Sung

(10) Patent No.: US 6,949,873 B2
(45) Date of Patent: Sep. 27, 2005

(54) AMORPHOUS DIAMOND MATERIALS AND ASSOCIATED METHODS FOR THE USE AND MANUFACTURE THEREOF

(76) Inventor: Chien-Min Sung, No. 4, Lane 32, Chung-Cheng Road, Tansui, Taipei County, Taiwan Province (CN), 23911

( * ) Notice: Subject to any disclaimer, the term of this patent is extended or adjusted under 35 U.S.C. 154(b) by 0 days.

(21) Appl. No.: 10/460,052

(22) Filed: Jun. 11, 2003

(65) Prior Publication Data

US 2004/0066127 A1 Apr. 8, 2004

Related U.S. Application Data

(63) Continuation-in-part of application No. 10/094,426, filed on Mar. 8, 2002, now Pat. No. 6,806,629.

(51) Int. Cl.[7] .............................. H01J 1/14; H01J 1/16; H01J 1/02
(52) U.S. Cl. ....................... 313/311; 313/309; 313/310; 313/336; 313/346 R; 313/351
(58) Field of Search .............................. 313/311, 346 R

(56) References Cited

U.S. PATENT DOCUMENTS

| | | |
|---|---|---|
| 4,448,799 A | 5/1984 | Bergman et al. |
| 4,511,593 A | 4/1985 | Brandolf |
| 4,556,471 A | 12/1985 | Bergman et al. |
| 4,571,447 A | 2/1986 | Prins |
| 4,620,913 A | 11/1986 | Bergman |
| 4,622,452 A | 11/1986 | Bergman et al. |
| 4,640,744 A | 2/1987 | Howe |
| 5,028,546 A | 7/1991 | Hotchkiss |
| 5,284,525 A | 2/1994 | Saito et al. |
| 5,294,322 A | 3/1994 | Vetter et al. |
| 5,458,754 A | 10/1995 | Sathrum et al. |
| 5,562,781 A | 10/1996 | Ingram et al. |
| 5,614,353 A | 3/1997 | Kumar et al. |
| 5,675,972 A | 10/1997 | Edelson |
| 5,679,895 A | 10/1997 | von Windheim |

(Continued)

Primary Examiner—Nimeshkumar D. Patel
Assistant Examiner—Sharlene Leurig
(74) Attorney, Agent, or Firm—Thorpe North & Western, LLP

(57) ABSTRACT

An amorphous diamond electrical generator having a cathode at least partially coated with amorphous diamond material and an intermediate member coupled between the cathode and an anode. The amorphous diamond material can have at least about 90% carbon atoms with at least about 20% of the carbon atoms bonded in a distorted tetrahedral coordination. The amorphous diamond coating has an energy input surface in contact with a base member of the cathode and an electron emission surface opposite the energy input surface. The electron emission surface can have an asperity height of from about 10 to about 1,000 nanometers and is capable of emitting electrons upon input of a sufficient amount of energy. The intermediate member can be coupled to the electron emission surface of the amorphous diamond coating such that the intermediate member has a thermal conductivity of less than about 100 W/mK and a resistivity of less than about 80 $\mu\Omega$-cm at 20° C. The amorphous diamond electrical generator is a thermionic emission device having improved electron emission properties.

41 Claims, 6 Drawing Sheets

U.S. PATENT DOCUMENTS

| | | |
|---|---|---|
| 5,712,488 A | 1/1998 | Stickel et al. |
| 5,713,775 A | 2/1998 | Geis et al. |
| 5,722,242 A | 3/1998 | Edelson |
| 5,777,427 A | 7/1998 | Tanaka et al. |
| 5,874,039 A | 2/1999 | Edelson |
| 5,959,400 A | 9/1999 | Niigaki et al. |
| 5,981,071 A | 11/1999 | Cox |
| 5,984,752 A | 11/1999 | Tanaka et al. |
| 5,994,638 A | 11/1999 | Edelson |
| 6,039,471 A | 3/2000 | Wyland |
| 6,055,815 A | 5/2000 | Peterson |
| 6,064,137 A | 5/2000 | Cox |
| 6,066,399 A | 5/2000 | Hirano et al. |
| 6,103,298 A | 8/2000 | Edelson et al. |
| 6,132,278 A | 10/2000 | Kang et al. |
| 6,139,964 A | 10/2000 | Sathrum et al. |
| 6,204,595 B1 | 3/2001 | Falabella |
| 6,214,651 B1 | 4/2001 | Cox |
| 6,229,083 B1 | 5/2001 | Edelson |
| 6,278,231 B1 | 8/2001 | Iwasaki et al. |

AMORPHOUS DIAMOND MATERIALS AND ASSOCIATED METHODS FOR THE USE AND MANUFACTURE THEREOF

PRIORITY DATA

This application is a continuation-in-part of U.S. patent application Ser. No. 10/094,425, filed on Mar. 8, 2002, now U.S. Pat. No. 6,806,624 which is incorporated herein by reference.

FIELD OF THE INVENTION

The present invention relates generally to devices and methods for generating electrons from diamond-like carbon material. Accordingly, the present application involves the fields of physics, chemistry, electricity, and material science.

BACKGROUND OF THE INVENTION

Thermionic and field emission devices are well known and used in a variety of applications. Field emission devices such as cathode ray tubes and field emission displays are common examples of such devices. Generally, thermionic electron emission devices operate by ejecting hot electrons over a potential barrier, while field emission devices operate by causing electrons to tunnel through a barrier. Examples of specific devices include those disclosed in U.S. Pat. Nos. 6,229,083; 6,204,595; 6,103,298; 6,064,137; 6,055,815; 6,039,471; 5,994,638; 5,984,752; 5,981,071; 5,874,039; 5,777,427; 5,722,242; 5,713,775; 5,712,488; 5,675,972; and 5,562,781, each of which is incorporated herein by reference.

The electron emission properties of thermionic devices are more highly temperature dependent than in field emission devices. An increase in temperature can dramatically affect the number of electrons which are emitted from thermionic device surfaces.

Although basically successful in many applications, thermionic devices have been less successful than field emission devices, as field emission devices generally achieve a higher current output. Despite this key advantage, most field emission devices suffer from a variety of other shortcomings that limit their potential uses, including materials limitations, versatility limitations, cost effectiveness, lifespan limitations, and efficiency limitations, among others.

A variety of different materials have been used in field emitters in an effort to remedy the above-recited shortcomings, and to achieve higher current outputs using lower energy inputs. One material that has recently become of significant interest for its physical properties is diamond. Specifically, pure diamond has a low positive electron affinity which is close to vacuum. Similarly, diamond doped with a low ionization potential element, such as cesium, has a negative electron affinity (NEA) that allows electrons held in its orbitals to be shaken therefrom with minimal energy input. However, diamond also has a high band gap that makes it an insulator and prevents electrons from moving through, or out of it. A number of attempts have been made to modify or lower the band gap, such as doping the diamond with a variety of dopants, and forming it into certain geometric configurations. While such attempts have achieved moderate success, a number of limitations on performance, efficiency, and cost, still exist. Therefore, the possible applications for field emitters remain limited to small scale, low current output applications.

As such, materials capable of achieving high current outputs by absorbing relatively low amounts of energy from an energy source continue to be sought through ongoing research and development efforts.

SUMMARY OF THE INVENTION

Accordingly, the present invention provides materials, devices, and methods for producing significant current output upon absorption of relatively low amounts of energy. In one aspect, the present invention provides an amorphous diamond material having a combination of material and geometric aspects that allows the generation of electrons upon absorption of a sufficient amount of energy. Such a material has a variety of uses and may be incorporated into a number of devices for this purpose.

At a basic level, such an amorphous diamond material can be utilized as part of a cathode. In one aspect, the cathode can include a base member having a layer of the amorphous diamond material coated over at least a portion thereof. The surface of the amorphous diamond layer in contact with the base member is an energy input surface and the opposite surface is an electron emission surface. The electron emission surface can have a variety of configurations or designs. However, in one aspect, the surface can include a plurality of projections having an asperity height of from about 10 to about 1,000 nanometers. Further, the specific material of the amorphous diamond layer can vary. However, in one aspect, the amorphous diamond material can include at least about 90% carbon atoms with at least about 20% of such carbon atoms bonded in distorted tetrahedral coordination. In another aspect, the amount of carbon atoms bonded in distorted tetrahedral coordination can be at least about 50%.

The cathode can be coupled to other members and materials in order to provide a complete circuit. For example, in some aspects, the cathode can be operatively coupled to an anode. In one embodiment, a vacuum space can be provided between the cathode and the anode for electrons to pass through. In another embodiment, an intermediate member can be coupled to the electron emission surface of the amorphous diamond coating, and to the anode. In one aspect, such intermediate member can have a thermal conductivity of less than about 100 W/mK and a resistivity of less than about 80 $\mu\Omega$-cm at 20° C. Suitable materials having such characteristics can include Pb, V, Cs, Hf, Ti, Nb, Zr, Ga, and mixtures or alloys thereof. In another aspect, the intermediate member can have a thermal conductivity and a resistivity less than that of iron. Thus, in one embodiment of the present invention, the intermediate member can have a thermal conductivity of less than about 80 W/mK and a resistivity of less than about 10 $\mu\Omega$-cm at 20° C.

In one alternative embodiment, the intermediate member can be formed of a thermally insulating material having a plurality of apertures extending therethrough. The plurality of apertures can contain a conductive metal. Various configurations of apertures and conductive materials allow for tailoring of the overall thermal and electrical conductivity of the intermediate member.

In another detailed aspect, an energy collector can be coupled to the cathode opposite the amorphous diamond material to enhance collection of energy to be directed toward the amorphous diamond layer. As an example, the energy collector can be a layer of carbon black, a rough surface having asperities in the nanometer or micron range or any other energy collecting material.

A variety of specific cathode configurations are possible under the present invention. For example, the cathode can be a single layer or multiple layers. In embodiments having multiple layers, the cathode can include a base member and a second layer of material placed between the base layer and the amorphous diamond coating. Various materials can advantageously be used as the second layer of material for a number of different purposes. However, in one aspect, the second layer can be of a material that has a work function of from about 1.5 eV to about 4.0 eV and can further have a thermal conductivity of greater than about 100 W/mK. In one embodiment, the second layer comprises a material having a work function of from about 2.0 eV to about 3.0 eV. Examples of materials suitable for the second layer include without limitation, Li, Na, K, Rb, Cs, Be, Mg, Ca, Sr, Ba, Ce, Sm, and mixtures or alloys thereof.

A variety of energy types can be harnessed by the material of the present invention to facilitate electron flow therefrom, such as thermal energy, photonic energy, electric field energy, and combinations thereof. However, in one aspect, the energy can be thermal energy used by itself or in combination with electric field energy. In another aspect, the energy can be photonic (i.e. light energy), used either by itself, or in combination with electric field energy. In yet another aspect, the energy can be electric field energy.

In some aspects, the amorphous diamond electrical generators of the present invention can be advantageously coupled to a heat source to produce an electrical current. Examples of typical heat sources include solar heat capturing or focusing assemblies, batteries, manufacturing process units, CPUs, and other electrical devices.

The diamond material of the present invention can be made using a variety of techniques known to those skilled in the art. Such methods generally require a carbon source to be provided, and the formation of the amorphous diamond material using a deposition technique. However, in one aspect, the amorphous diamond material can be formed using a cathodic arc technique. The various members and layers of the present invention such as the second layer, intermediate member, cathode and anode can be formed by PVD, CVD, sputtering, brazing, or other known techniques.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and, "the" include plural referents unless the context clearly dictates otherwise. Thus, for example, reference to "a diamond particle" includes one or more of such particles, reference to "a carbon source" includes reference to one or more of such carbon sources, and reference to "a cathodic arc technique" includes reference to one or more of such techniques.

Definitions

In describing and claiming the present invention, the following terminology will be used in accordance with the definitions set forth below.

As used herein, "vacuum" refers to a pressure condition of less than $10^{-2}$ torr.

Figure 6:
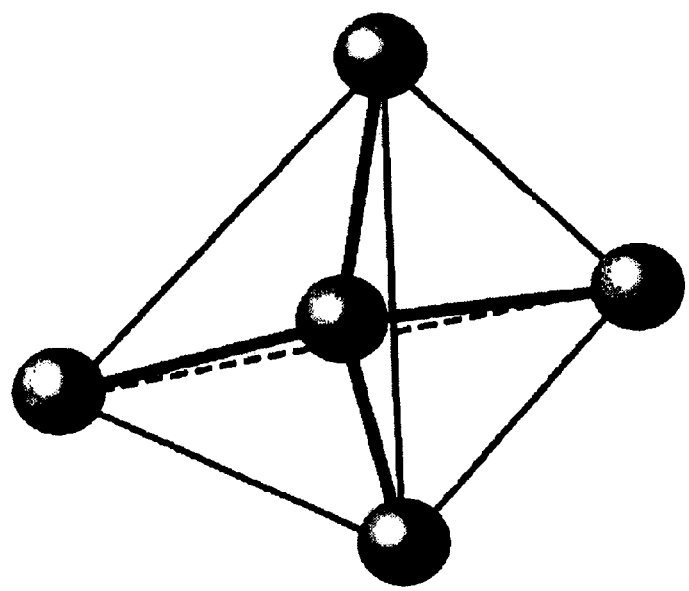
FIG. 6 shows a perspective view of a diamond tetrahedron having regular or normal tetrahedron coordination of carbon bonds.

As used herein, "diamond" refers to a crystalline structure of carbon atoms bonded to other carbon atoms in a lattice of tetrahedral coordination known as $sp^3$ bonding. Specifically, each carbon atom is surrounded by and bonded to four other carbon atoms, each located on the tip of a regular tetrahedron. Further, the bond length between any two carbon atoms is 1.54 angstroms at ambient temperature conditions, and the angle between any two bonds is 109 degrees, 28 minutes, and 16 seconds although experimental results may vary slightly. A representation of carbon atoms bonded in a normal or regular tetrahedron configuration in order to form diamond is shown in FIG. 6. The structure and nature of diamond, including its physical and electrical properties are well known in the art.

Figure 7:
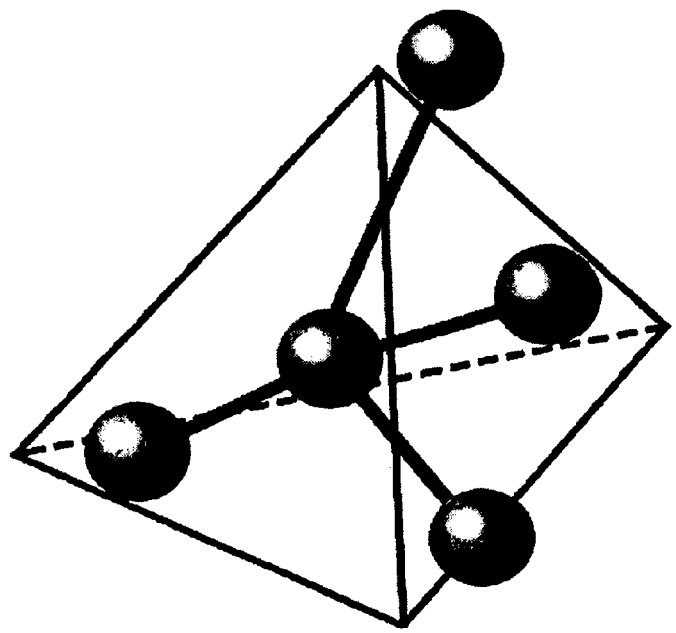
FIG. 7 shows a perspective view of a carbon tetrahedron having irregular, or abnormal tetrahedron coordination of carbon bonds.

As used herein, "distorted tetrahedral coordination" refers to a tetrahedral bonding configuration of carbon atoms that is irregular, or has deviated from the normal tetrahedron configuration of diamond as described above. Such distortion generally results in lengthening of some bonds and shortening of others, as well as the variation of the bond angles between the bonds. Additionally, the distortion of the tetrahedron alters the characteristics and properties of the carbon to effectively lie between the characteristics of carbon bonded in $sp^3$ configuration (i.e. diamond) and carbon bonded in $sp^2$ configuration (i.e. graphite). One example of material having carbon atoms bonded in distorted tetrahedral bonding is amorphous diamond. A representation of carbon atoms bonded in distorted tetrahedral coordination is shown in FIG. 7. It will be understood that FIG. 7 is a representation of merely one possible distorted tetrahedral configuration and a wide variety of distorted configurations are generally present in amorphous diamond.

As used herein, "amorphous diamond" and "diamond-like-carbon" may be used interchangeably and refer to a material having carbon atoms as the majority element, with a substantial amount of such carbon atoms bonded in distorted tetrahedral coordination. Notably, a variety of other elements can be included in the carbonaceous material as either impurities, or as dopants, including without limitation, hydrogen, sulfur, phosphorous, boron, nitrogen, silicon, tungsten, etc. In one aspect, the amount of carbon in the amorphous diamond can be at least about 90%, with at least about 20% of such carbon being bonded in distorted tetrahedral coordination.

As used herein, "asperity" refers to the roughness of a surface as assessed by various characteristics of the surface anatomy. Various measurements may be used as an indicator of surface asperity, such as the height of peaks or projections thereon, and the depth of valleys or concavities depressing therein. Further, measures of asperity include the number of peaks or valleys within a given area of the surface (i.e. peak or valley density), and the distance between such peaks or valleys.

As used herein, "metallic" refers to a metal, or an alloy of two or more metals. A wide variety of metallic materials are known to those skilled in the art, such as aluminum, copper, chromium, iron, steel, stainless steel, titanium, tungsten, zinc, zirconium, molybdenum, etc., including alloys and compounds thereof.

As used herein, "substantial" when used in reference to a quantity or amount of a material, or a specific characteristic thereof, refers to an amount that is sufficient to provide an effect that the material or characteristic was intended to provide. Further, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

As used herein, "electron affinity" refers to the tendency of an atom to attract or bind a free electron into one of its orbitals. Further, "negative electron affinity" (NEA) refers to the tendency of an atom to either repulse free electrons, or to allow the release of electrons from its orbitals using a small energy input. NEA is generally the energy difference between a vacuum and the lowest energy state within the conduction band. Those of ordinary skill in the art will recognize that negative electron affinity may be imparted by the compositional nature of the material, or the crystal irregularities, e.g. defects, inclusions, grain boundaries, twin planes, or a combination thereof.

As used herein, "work function" refers to the amount of energy, typically expressed in eV, required to cause electrons in the highest energy state of a material to emit from the material into a vacuum space. Thus, a material such as copper having a work function of about 4.5 eV would require 4.5 eV of energy in order for electrons to be released from the surface into a theoretical perfect vacuum at 0 eV.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 micron to about 5 microns" should be interpreted to include not only the explicitly recited values of about 1 micron to about 5 microns, but also include individual values and sub-ranges within the indicated range. Thus, included in this numerical range are individual values such as 2, 3, and 4 and sub-ranges such as from 1–3, from 2–4, and from 3–5, etc.

This same principle applies to ranges reciting only one numerical value. Furthermore, such an interpretation should apply regardless of the breadth of the range or the characteristics being described.

The Invention

The present invention involves an amorphous diamond material that can be used to generate electrons upon input of a sufficient amount of energy. As recited in the background section, utilization of a number of materials have been attempted for this purpose, including the diamond materials and devices disclosed in WO 01/39235, which is incorporated herein by reference. Due to its high band gap properties, diamond is unsuitable for use as an electron emitter unless modified to reduce or alter the band gap. Thus far, the techniques for altering diamond band gap, such as doping the diamond with various dopants, and configuring the diamond with certain geometric aspects have yielded electron emitters of questionable use.

It has now been found that various amorphous diamond materials can easily emit electrons when an energy source is applied. Such materials retain the NEA properties of diamond, but do not suffer from the band gap issues of pure diamond. Thus, electrons energized by applied energy are allowed to move readily through the amorphous diamond material, and be emitted using significantly lower energy inputs, than those required by diamond. Further, the amorphous diamond material of the present invention has been found to have a high energy absorption range, allowing for a wider range of energies to be converted into electrons, and thus increasing the conversion efficiency.

A variety of specific amorphous diamond materials that provide the desired qualities are encompassed by the present invention. One aspect of the amorphous diamond material that facilitates electron emission is the distorted tetrahedral coordination with which many of the carbon atoms are bonded. Tetrahedral coordination allows carbon atoms to retain the $sp^3$ bonding characteristic that may facilitate the surface condition required for NEA, and also provides a plurality of effective band gaps, due to the differing bond lengths of the carbon atom bonds in the distorted tetrahedral configuration. In this manner, the band gap issues of pure diamond are overcome, and the amorphous diamond material becomes effective for emitting electrons. In one aspect of the present invention, the amorphous diamond material can contain at least about 90% carbon atoms with at least about 20% of such carbon atoms being bonded with distorted tetrahedral coordination. In another aspect, the amorphous diamond can have at least 50% of the carbon atoms bonded in distorted tetrahedral coordination.

Figure 1:
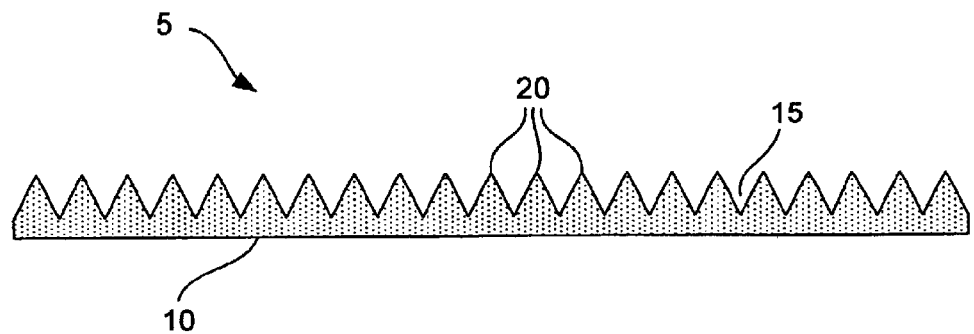
FIG. 1 shows a side view of one embodiment of an amorphous diamond material in accordance with the present invention.
Figure 3:
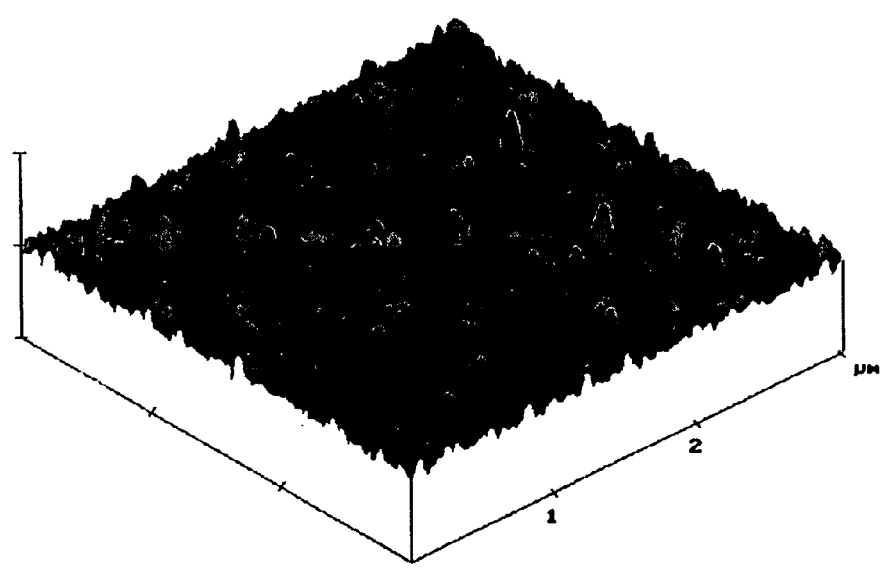
FIG. 3 shows a perspective view of one embodiment of an amorphous diamond material made using a cathodic arc procedure in accordance with one aspect of the present invention.
Figure 4:
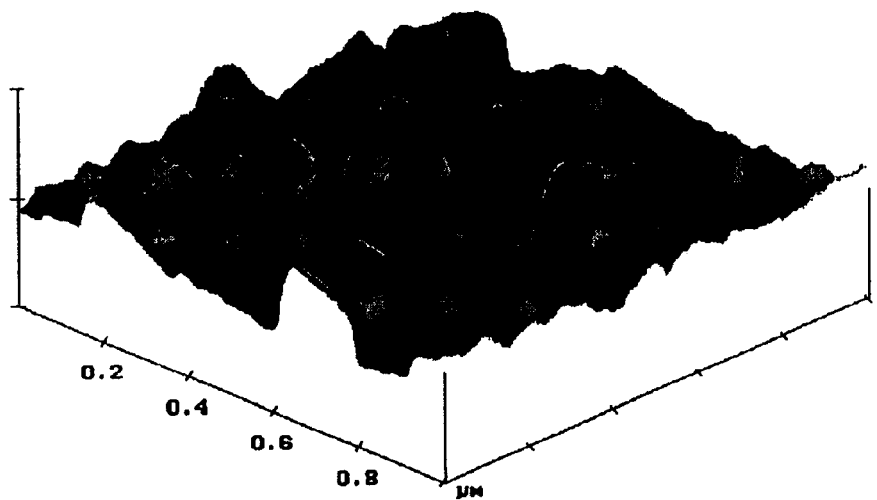
FIG. 4 shows an enlarged view of a section of the amorphous diamond material shown in FIG. 3.

Another aspect of the present amorphous diamond material that facilitates electron emission is the presence of certain geometric configurations. Referring now to FIG. 1, is shown a side view of one embodiment of a configuration for the amorphous diamond material 5, made in accordance with the present invention. Specifically, the amorphous diamond material has an energy input surface 10, that receives energy, for example, thermal energy, and an emission surface 15 that emits electrons therefrom. In order to further facilitate the emission of electrons, the emission surface can be configured with an emission surface that has a roughness or asperity, that focuses electron flow and increases current output, such asperity represented here by a plurality of peaks or projections 20. It should be noted that although FIG. 1 illustrates uniform peaks, such is only for convenience, and that the amorphous diamond of the present invention is typically non-uniform and the distances between peaks and the peak heights can vary as shown in FIGS. 3 and 4.

While a number of prior devices have attempted to thusly focus electrons, for example by imparting a plurality of pyramids or cones to an emission surface, none have as of yet, been able to achieve the high current output required to be viable for many applications, using a feasible energy input in a cost effective manner. More often than not, this inadequacy results from the fact that the pyramids, cones, etc. are too large and insufficiently dense to focus the electrons as needed to enhance flow. Such sizes are often greater than several microns in height, thus allowing only a projection density of less than 1 million per square centimeter. While carbon nanotubes have achieved higher outputs than other known emitters, carbon nanotubes have shown to be fragile, short lived, and inconsistent in the levels and flow of electrons achieved.

In one aspect of the present invention, the asperity of the emission surface can have a height of from about 10 to about 1,000 nanometers. In another aspect, the asperity height can be about 800 nanometers. In yet another aspect, the asperity height can be about 100 nanometers. Further, the asperity can have a peak density of at least about 1 million peaks per square centimeter of emission surface. In yet another aspect, the peak density can be at least about 100 million peaks per square centimeter of the emission surface. In a further aspect, the peak density can be at least about 1 billion peaks per square centimeter of the emission surface. Any number of height and density combinations can be used in order to achieve a specific emission surface asperity, as required in order to generate a desire electron output. However, in one aspect, the asperity can include a height of about 800 nanometers and a peak density of at least about, or greater than about 1 million peaks per square centimeter of emission surface. In yet another aspect, the asperity can include a height of about 1,000 nanometers and a peak density of at least about, or greater than 1 billion peaks per square centimeter of emission surface.

The amorphous diamond material of the present invention is capable of utilizing a variety of different energy input types in order to generate electrons. Examples of suitable energy types can include without limitation, heat or thermal energy, light or photonic energy, and electric field energy. Thus, suitable energy sources are not limited to visible light or any particular frequency range and can include the entire visible, infrared, and ultraviolet ranges of frequencies. Those of ordinary skill in the art will recognize other energy types that may be capable of sufficiently vibrating the electrons contained in the amorphous diamond material to affect their release and movement through and out of the material. Further, various combinations of energy types can be used in order to achieve a specifically desired result, or to accommodate the functioning of a particular device into which the amorphous diamond material is incorporated.

In one aspect of the invention, the energy type utilized can be thermal energy. To this end, an energy absorber and collection layer can be used in connection with or coupled to the amorphous diamond material of the present invention that aids in the absorption and transfer of heat into the material. As will be recognized by those of ordinary skill in the art, such an absorber can be composed of a variety of materials that are predisposed to the absorption of thermal energy, such as carbon black, etc. In accordance with the present invention, the thermal energy absorbed by the amorphous diamond material can have a temperature of less than about 500° C. Additionally, such absorber collection layers can be designed for absorbing photonic and/or thermal energy such as carbon black, sprayed graphite particles, or any other dark or black body. In one alternative, the absorber collection layer can have an increased surface roughness to enhance the amount of light and/or heat absorbed. Various methods of providing textured surfaces are known to those skilled in the art.

In another aspect of the present invention, the energy used to facilitate electron flow can be electric field energy (i.e. a positive bias). Thus, in some embodiments of the present invention a positive bias can be applied in conjunction with other energy sources such as heat and/or light. Such a positive bias can be applied to the amorphous diamond material and/or intermediate member described below, or with a variety of other mechanisms known to those of ordinary skill in the art. Specifically, the negative terminal of a battery or other current source can be connected to the electrode and/or amorphous diamond and the positive terminal connected to the intermediate material or gate member placed between the amorphous diamond electron emission surface and the anode.

Figure 2:
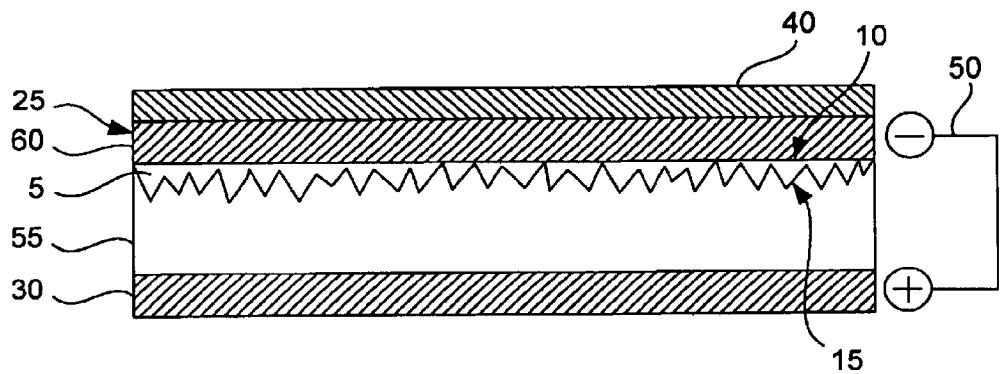
FIG. 2 shows a side view of the amorphous diamond material of FIG. 1 assembled with various components to form a device that is capable of emitting electrons by absorbing a sufficient amount of energy.

The amorphous diamond material of the present invention can be further coupled to, or associated with a number of different components in order to create various devices. Referring now to FIG. 2, is shown one embodiment of an amorphous diamond electrical generator in accordance with the present invention. Notably, the cathode 25 has a layer of amorphous diamond material 5 coated thereon. The surface of the amorphous diamond which contacts the cathode is input surface 10. Further, as discussed above, an optional energy collection layer 40 can be coupled to the cathode opposite the amorphous diamond layer. The energy collector can be included as desired, in order to enhance the collection and transmission of thermal or photonic energy to the amorphous diamond material. An intermediate member 55 is coupled to the electron emission surface 15 of the amorphous diamond material 5. An anode 30 is coupled to the intermediate member opposite the amorphous diamond material. In one aspect of the present invention, the entire amorphous diamond electrical generator is a solid assembly having each layer in continuous intimate contact with adjacent layers and/or members.

Those of ordinary skill in the art will readily recognize other components that can, or should, be added to the assembly of FIG. 2 in order to achieve a specific purpose, or make a particular device. By way of example, without limitation, a connecting line 50 can be placed between the cathode and the anode to form a complete circuit and allow electricity to pass that can be used to run one or more electricity requiring devices (not shown), or perform other work. Further, input and output lines, as well as an electricity source (not shown) can be connected to the intermediate member 55, in order to provide the current required to induce an electric field, or positive bias, as well as other needed components to achieve a specific device, will be readily recognized by those of ordinary skill in the art.

The above-recited components can take a variety of configurations and be made from a variety of materials. Each of the layers discussed below can be formed using any number of known techniques. In one aspect, each layer is formed using deposition techniques such as PVD, CVD, or any other known thin-film deposition process. In one aspect, the PVD process is sputtering or cathodic arc. Further, suitable electrically conductive materials and configurations will be readily recognized by those skilled in the art for the cathode 25 and the anode 30. Such materials and configurations can be determined in part by the function of the device into which the assembly is incorporated. Additionally, the layers can be brazed or otherwise affixed to one another using methods which do not interfere with the thermal and electrical properties as discussed below. Although, a variety of geometries and layer thicknesses can be used typical thicknesses are from about 10 nanometers to about 3 microns for the amorphous diamond emission surface and from about 1 micron to about 1 millimeter for other layers.

The cathode 25 can be formed having a base member 60 with a layer of amorphous diamond 5 coated over at least a portion thereof. The base member can be formed of any conductive electrode material such as a metal. Suitable metals include, without limitation, copper, aluminum, nickel, alloys thereof, and the like. One currently preferred material used in forming the base member is copper. Similarly, the anode 30 can be formed of the same materials as the base member or of different conductive materials. As a general guideline, the anode and/or cathode base member can have a work function of from about 3.5 eV to about 6.0 eV and in a second embodiment from about 3.5 eV to about 5.0 eV. Although a variety of thicknesses are functional for the cathode and/or anode, typical thickness range from about 0.1 mm to about 10 mm.

The base member 60 of the cathode 25 can be a single or multiple layers. In one embodiment, the base member is a single layer of material. In another embodiment, the base member includes a first layer and a second layer (not shown) such that the second layer is coupled between the first layer and the energy input surface of the amorphous diamond layer. The second layer acts to improve electron conduction to the emission surface of the diamond layer. Typically, the second layer comprises a material having a low work function of from about 2.0 eV to about 4.0 eV, although work functions of from about 2.0 eV to about 3.0 eV are also suitable. More preferably, the second layer comprises a material having a work function of from about 1.5 eV to about 3.5 eV. Suitable materials for use in the second layer include, without limitation, Li, Na, K, Rb, Cs, Be, Mg, Ca, Sr, Ba, Ce, Sm, and mixtures or alloys thereof. In a more specific aspect, the second layer can comprise Be, Mg, Cs, or Sm. In order to improve heat transfer toward the amorphous diamond layer, the second layer can comprise a material which has a thermal conductivity of greater than about 100 W/mK. As with other layers or members, a variety of thicknesses can be used however, the second layer is often from about 1 micron to about 1 millimeter. Those skilled in the art will recognize that typical low work function materials also readily oxidize. Thus, it may be desirable to form at least the second layer, and often the entire electrical generator, under a vacuum or other inert environment.

Without wishing to be bound to any particular theory, the ability of the present invention to produce electricity can be viewed as a stepping process related to the band gap between materials, work function, and thermal conductivity of each layer. Specifically, the second layer of the cathode can be made of a material that acts to step the electrons closer to vacuum energy or conduction band, (i.e. decrease the band gap between the first layer and vacuum energy).

Additionally, the second layer can have a high thermal conductivity in order to improve electron flow toward the electron emission surface. The electrons in the second layer can then be transmitted to the amorphous diamond layer where the distorted tetrahedral coordinations of the amorphous diamond create a variety of different work function and band gap values (i.e. within the unoccupied conduction band) within the amorphous diamond layer, such that some of the electron states approach and exceed the vacuum energy.

The material for use in the intermediate member can then be chosen to minimize heat loss by allowing the electrons to transfer, or "step" back down to the anode material. This decreases the amount of energy which is lost in the system. For example, a large step from amorphous diamond down to a high work function material can be used in the present invention; however, some of the electrical energy is lost as heat. Thus, more than one intermediate member and/or base member layers can be incorporated into the generator to provide varying degrees of "steps up" and "steps down" between the energy band gaps among the respective layers. Thus, the intermediate member can be formed of a plurality of layers each having different electrical and thermal properties.

In addition, it is frequently desirable to minimize the thermal conductivity of the intermediate member such that there is a thermal gradient maintained from the cathode to the anode. Further, operating temperatures can vary greatly depending on the application and energy source. Cathode temperatures can be from about 100° C. to about 1800° C. and can often be above about 300° C. Alternatively, cathode temperatures can be below about 100° C. such as from about 0° C. to about 100° C. Although temperatures outside these ranges can be used, these ranges provide an illustration of the temperature gradient which can exist across the generator of the present invention.

As shown in FIG. 2, an intermediate member 55 can be coupled to the electron emission surface 15. The intermediate member can be formed of a material having a thermal conductivity of less than about 100 W/mK and a resistivity of less than about 80 $\mu\Omega$-cm at 20° C. In choosing appropriate materials for use in the intermediate layer, at least two factors are considered. First, the material should act to minimize thermal transfer across the layer. Thus, materials having a relatively low thermal conductivity are desirable. In one aspect, the intermediate member comprises a material having a thermal conductivity less than about 100 W/mK such as below about 80 W/mK. Materials having thermal conductivities of below about 40 W/mK can also be advantageously used. Second, the intermediate member should be relatively conductive. In one aspect, the intermediate member also has a resistivity of less than about 80 $\mu\Omega$-cm at 20° C. and more preferably below about 10 $\mu\Omega$-cm at 20° C. Specifically, reference is now made to FIG. 8 which is a plot of resistivity versus thermal conductivity for various elements. It is understood that various alloys and compounds will also exhibit the properties desirable for the intermediate member and such are considered within the scope of the present invention.

Figure 8:
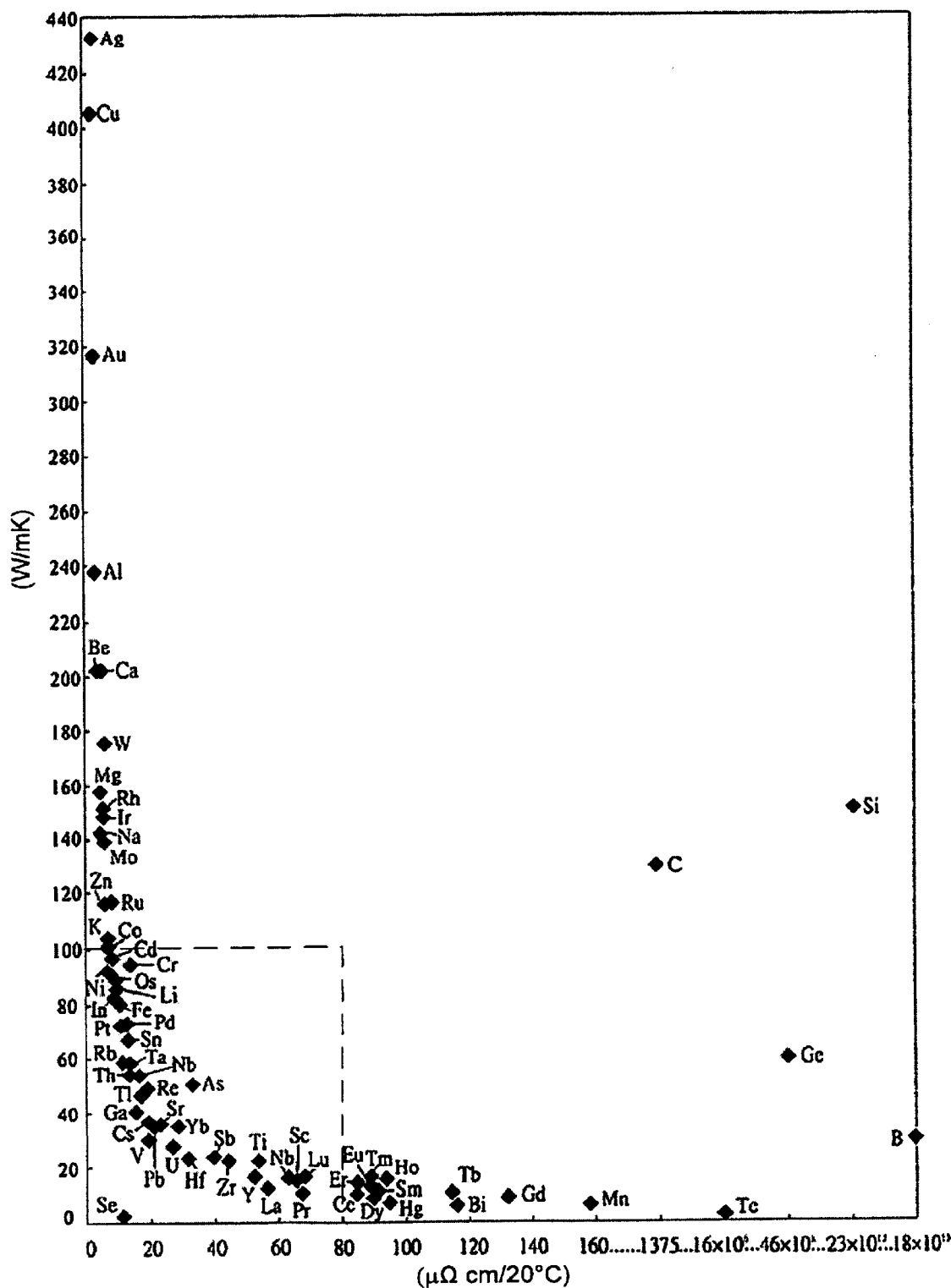
FIG. 8 shows a graph of resistivity versus thermal conductivity for most the elements.

Referring to FIG. 8 it can be seen that among the elements there is a general trend of increasing resistivity (decreased conductivity) with decreases in thermal conductivity. However, elements in the region shown by a dashed box exhibit both low thermal conductivity and high electrical conductivity. Exemplary materials from this region include Pb, V, Cs, Hf, Ti, Nb, Zr, Ga, and mixtures or alloys thereof. In one aspect of the present invention, the intermediate member comprises Cs. One helpful measure of suitable electronic properties for various layers is work function. The intermediate member can comprise a material having a work function of from about 1.5 eV to about 4.0 eV, and in another aspect can be from about 2.0 eV to about 4.0 eV. Other suitable materials can also be chosen based on the above guidelines. In one embodiment of the present invention, the intermediate member can have a thickness of from about 0.1 millimeters to about 1 millimeter.

In an alternative embodiment, the intermediate member can be constructed so as to satisfy the above guidelines regarding thermal and electrical conductivity while expanding the types of materials which can be used. Specifically, the intermediate member can be formed of a primary thermally insulating material having a plurality of apertures extending therethrough (not shown). Although electrically conductive materials are of course preferred any thermally insulating material can be used. Suitable insulating materials can be chosen by those skilled in the art. Non-limiting examples of suitable thermally insulating materials include ceramics and oxides. Several currently preferred oxides include $ZrO_2$, $SiO_2$, and $Al_2O_3$. The apertures extend from the electron emission surface of the diamond layer to the anode. One convenient method of forming the apertures is by laser drilling. Other methods include anodization of a metal such as aluminum. In such a process small indentations can be formed in the aluminum surface, and then upon anodization, electrons will flow preferentially through the indented areas and dissolve the aluminum to form straight and parallel apertures. The surrounding aluminum is oxidized to form $Al_2O_3$.

Once the apertures are formed, a more highly conductive metal can be deposited into the apertures. The apertures can be filled by electrodeposition, physical flow, or other methods. Almost any conductive material can be used, however in one aspect the conductive material can be copper, aluminum, nickel, iron, and mixtures or alloys thereof. In this way, conductive metals can be chosen which have high conductivity without the limitations on thermal conductivity. The ratio of surface of area covered by apertures to surface area of insulating material can be adjusted to achieve an overall thermal conductivity and electrical conductivity within the guidelines set forth above. Further, the pattern, aperture size, and aperture depth can be adjusted to achieve optimal results. In one aspect, the surface area of the apertures constitute from about 10% to about 40% of the surface of the intermediate layer which is in contact with the electron emission surface of the amorphous diamond layer.

Because of the ease with which electrons can be generated using the amorphous diamond material of the present invention, it has been found that inducing electron flow using an applied electric field facilitates the absorption of heat at the electron input surface, thus enabling the electron emitter of the present invention to be used as a cooling device. As such, the present invention encompasses a cooling device that is capable of absorbing beat by emitting electrons under an induced electrical field. Such a device can take a variety of forms and utilize a number of supporting components, such as the components recited in the electrical generator above. In one aspect, the cooling device is capable of cooling an adjacent area to a temperature below 100° C. Alternatively, the present invention can be used as a heat pump to transfer heat from a low heat area or volume to an area having higher amounts heat.

The amorphous diamond material used in the present invention can be produced using a variety of processes known to those skilled in the art. However, in one aspect, the material can be made using a cathodic arc method. Various cathodic arc processes are well known to those of ordinary skill in the art, such as those disclosed in U.S. Pat. Nos. 4,448,799; 4,511,593; 4,556,471; 4,620,913; 4,622,452; 5,294,322; 5,458,754; and 6,139,964, each of which is incorporated herein by reference. Generally speaking, cathodic arc techniques involve the physical vapor deposition (PVD) of carbon atoms onto a target, or substrate. The arc is generated by passing a large current through a graphite electrode that serves as a cathode, and vaporizing carbon atoms with the current. The vaporized atoms also become ionized to carry a positive charge. A negative bias of varying intensity is then used to drive the carbon atoms toward an electrically conductive target. If the carbon atoms contain a sufficient amount of energy (i.e. about 100 eV) they will impinge on the target and adhere to its surface to form a carbonaceous material, such as amorphous diamond.

In general, the kinetic energy of the impinging carbon atoms can be adjusted by the varying the negative bias at the substrate and the deposition rate can be controlled by the arc current. Control of these parameters as well as others can also adjust the degree of distortion of the carbon atom tetrahedral coordination and the geometry, or configuration of the amorphous diamond material (i.e. for example, a high negative bias can accelerate carbon atoms and increase $sp^3$ bonding). By measuring the Raman spectra of the material the $sp^3/sp^2$ ratio can be determined. However, it should be kept in mind that the distorted tetrahedral portions of the amorphous diamond layer are neither $sp^3$ nor $sp^2$ but a range of bonds which are of intermediate character. Further, increasing the arc current can increase the rate of target bombardment with high flux carbon ions. As a result, temperature can rise so that the deposited carbon will convert to more stable graphite. Thus, final configuration and composition (i.e. band gaps, NEA, and emission surface asperity) of the amorphous diamond material can be controlled by manipulating the cathodic arc conditions under which the material is formed.

Various applications of the devices and methods discussed herein will occur to those skilled in the art. In one aspect, the electrical generators of the present invention can be incorporated into devices which produce waste heat. The cathode side or energy input surface of the present invention can be coupled to a heat source such as a boiler, battery such as rechargeable batteries, CPUs, resistors, other electrical components, or any other device which produces waste heat which is not otherwise utilized. For example, an electrical generator of the present invention can be coupled to a laptop battery. As such the electrical generator can supplement the power supply and thus extend battery life. In another example, one or more electrical generators can be attached to the outer surface of a boiler or other heat producing unit of a manufacturing plant to likewise supplement the electrical demands of the manufacturing process. Thus, as can be seen, a wide variety of applications can be devised using thermal, light or other energy sources to produce electricity in useful amounts.

Moreover, amorphous diamond may be coated onto ordinary electrodes to facilitate the flow of electrons. Such electrodes can be used in batteries and electro-deposition of metals, such as electroplating. In one aspect, the electrodes can be used in an aqueous solution. For example, electrodes that are used to monitor the quality of water or other food stuff, such as juice, beer, soda, etc. by measuring the resistivity of the water. Due to its anti-corrosive properties, electrodes of amorphous diamond pose a significant advantage over conventional electrodes.

One particular application where amorphous diamond electrodes would be of significant advantage is in electro-deposition applications. Specifically, one problem experienced by most electro-deposition devices is the polarization of the electrode by the absorption of various gasses. However, due to the strongly inert nature of amorphous diamond, cathodes and anodes coated therewith are virtually unpolarizable. Further, this inert nature creates an electric potential in aqueous solution that is much higher than that obtained using metallic or carbon electrodes. Under normal circumstances, such a voltage would dissociate the water. However, due to the high potential of amorphous diamond, the solute contained in the solution is driven out before the water can be dissociated. This aspect is very useful, as it enables the electro-deposition of elements with high oxidation potentials, such as Li and Na which has been extremely difficult, if not impossible in the past.

In a similar aspect, because of the high potential achieved by amorphous diamond electrodes in solution, solutes that are present in very minute amounts may be driven out of solution and detected. Therefore, the material of the present invention is also useful as part of a highly sensitive diagnostic tool or device which is capable of measuring the presence of various elements in solution, for example, lead, in amounts as low as parts per billion (ppb). Such applications include the detection of nearly any element that can be driven or attracted to an electrical charge, including biomaterials, such as blood and other bodily fluids, such as urine.

As alluded to above, the present invention encompasses methods for making the amorphous diamond material disclosed herein, as well as methods for the use thereof. In addition to the electrical generator and cooling devices recited above, a number of devices that operate on the principles of emitting electrons may beneficially utilize the amorphous diamond material of the present invention. A number of such devices will be recognized by those skilled in the art, including without limitation, transistors, ultra fast switches, ring laser gyroscopes, current amplifiers, microwave emitters, and various other electron beam devices.

In one aspect, a method for making an amorphous diamond material capable of emitting electrons by absorbing a sufficient amount of energy, includes the steps of providing a carbon source, and forming an amorphous diamond material therefrom, using a cathodic arc method. A method for generating a flow of electrons or generating an electrical current can include the steps of forming an amorphous diamond material as recited herein, and inputting an amount of energy into the material that is sufficient to generate electron flow. The second layer of the base member of the cathode and the intermediate member can be formed using CVD, PVD, sputtering, or other known process. In one aspect, the layers are formed using sputtering. In addition, the anode can be coupled to the intermediate member using CVD, PVD, sputtering, brazing, gluing (e.g. with a silver paste) or other methods known to those skilled in the art. Although the anode is commonly formed by sputtering or arc deposition, the anode can be coupled to the intermediate member by brazing. In an optional step, the amorphous diamond generator can be heat treated in a vacuum furnace. Heat treatment can improve the thermal and electrical properties across the boundaries between different materials. Typical heat treatment temperatures can range from about 200° C. to about 800° C. and more preferably from about 350° C. to about 500° C. depending on the specific materials chosen.

The following are examples illustrate various methods of making electron emitters in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

EXAMPLE 1

An amorphous diamond material was made as shown in FIG. 3, using cathodic arc deposition. Notably, the asperity of the emission surface has a height of about 200 nanometers, and a peak density of about 1 billion peaks per square centimeter. In the fabrication of such material, first, a silicon substrate of N-type wafer with (200) orientation was etched by Ar ions for about 20 minutes. Next, the etched silicon wafer was coated with amorphous diamond using a Tetrabond® coating system made by Multi-Arc, Rockaway, N.J. The graphite electrode of the coating system was vaporized to form an electrical arc with a current of 80 amps, and the arc was drive by a negative bias of 20 volts toward the silicon substrate, and deposited thereon. The resulting amorphous diamond material was removed from the coating system and observed under an atomic force microscope, as shown in FIGS. 3 and 4.

Figure 5:
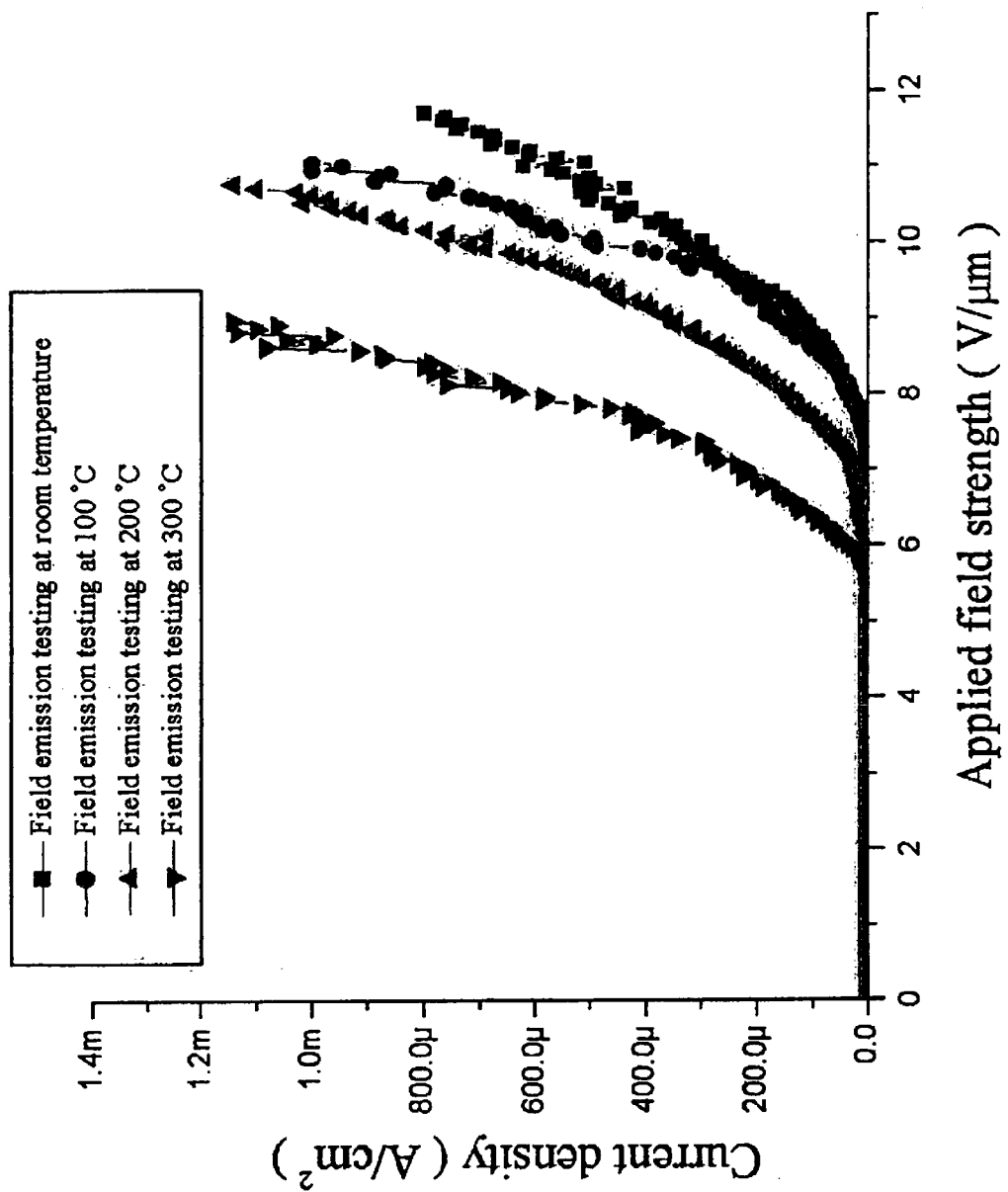
FIG. 5 shows a graphical representation of an electrical current generated under an applied electrical field at various temperatures by one embodiment of the amorphous diamond generator of the present invention.

The amorphous diamond material was then coupled to an electrode to form a cathode, and an electrical generator in accordance with the present invention was formed. An external electrical bias was applied and the resultant electrical current generated by the amorphous diamond material was measured and recorded as shown in FIG. 5 at several temperatures.

EXAMPLE 2

A 10 micron layer of copper can be deposited on a substrate using sputtering. Onto the copper was deposited 2 microns of samarium by sputtering onto the copper surface under vacuum. Of course, care should be taken so as to not expose the beryllium to oxidizing atmosphere (e.g. the entire process can be performed under a vacuum). A layer of amorphous diamond material can then be deposited using the cathodic arc technique as in Example 1 resulting in a thickness of about 0.5 microns. Onto the growth surface of the amorphous diamond a layer of magnesium can be deposited by sputtering, resulting in a thickness of about 10 microns. Finally a 10 microns thick layer of copper was deposited by sputtering to form the anode.

EXAMPLE 3

Figure 9A:
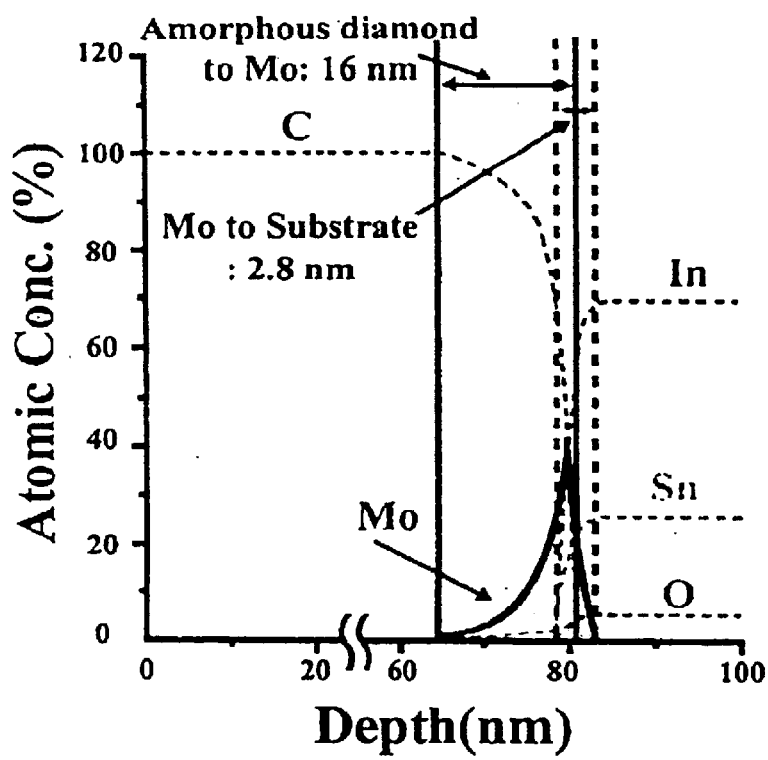
FIG. 9A shows a graph of atomic concentration versus depth for an embodiment of the present invention prior to heat treatment.
Figure 9B:
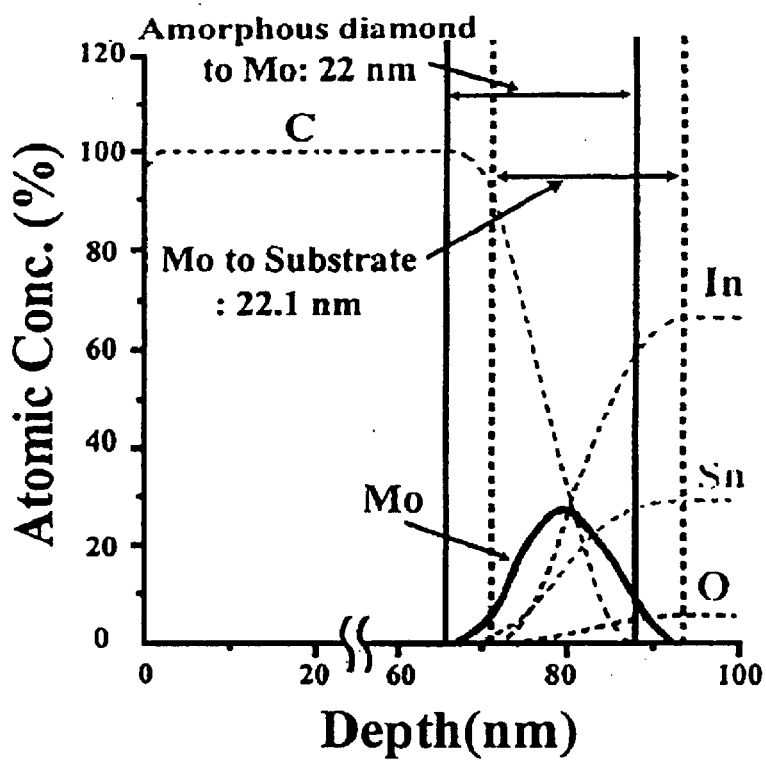
FIG. 9B shows a graph of atomic concentration versus depth for the embodiment shown in FIG. 9B subsequent to heat treatment.

A 10 micron layer of copper can be deposited on a substrate using sputtering. Onto the copper was deposited 2 microns of cesium by sputtering onto the copper surface under vacuum. Of course, care should be taken so as to not expose the cesium to oxidizing atmosphere (e.g. the entire process can be performed under a vacuum). A layer of amorphous diamond material can then be deposited using the cathodic arc technique as in Example 1 resulting in a thickness of about 65 nm. Onto the growth surface of the amorphous diamond a layer of molybdenum can be deposited by sputtering, resulting in a thickness of about 16 nm. Additionally, a 20 nm thick layer of In—Sn oxide was deposited by sputtering to form the anode. Finally, a 10 micron layer of copper was deposited on the In—Sn layer by sputtering. The cross-sectional composition of the assembled layers is shown in part by FIG. 9A as deposited. The assembled layers were then heated to 400° C. in a vacuum furnace. The cross-sectional composition of the final amorphous diamond electrical generator is shown in part by FIG. 9B. Notice that the interface between layers does not always exhibit a distinct boundary, but is rather characterized by compositional gradients from one layer to the next. This heat treatment improves the electron transfer across the boundary between the anode and the intermediate material and between the amorphous diamond and the intermediate material. Measurement of applied field strength versus current density at 25° C. resulted in a response which is nearly the same as the response shown in FIG. 5 at 400° C. It is expected that measurements at temperatures above 25° C. will show a similar trend as a function of temperature as that illustrated in FIG. 5, wherein the current density increases at lower applied voltages.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An amorphous diamond electrical generator comprising:
   a) a cathode having a base member with a layer of amorphous diamond material coated over at least a portion thereof, said amorphous diamond material comprising at least about 90% carbon atoms with at least about 20% of said carbon atoms bonded in distorted tetrahedral coordination, said diamond coating being configured with an energy input surface in contact with the base member and an electron emission surface opposite the energy input surface, said electron emission surface having an asperity height of from about 10 to about 1,000 nanometers, and being capable of emitting electrons upon input of a sufficient amount of energy into the amorphous diamond material;
   b) an intermediate member coupled to the electron emission surface of the amorphous diamond coating, said intermediate member comprising a material having a thermal conductivity of less than about 100 W/mK and a resistivity of less than about 80 $\mu\Omega$-cm at 20° C.; and
   c) an anode coupled to the intermediate member opposite the amorphous diamond coating.

2. The generator of claim 1, wherein the base member of the cathode is a single layer.

3. The generator of claim 1, wherein the base member of the cathode includes a first layer and a second layer coupled between the first layer and the energy input surface of the amorphous diamond coating, wherein the second layer has a work function of from about 2 eV to about 4.0 eV.

4. The generator of claim 3, wherein the second layer comprises a material having a thermal conductivity of greater than about 100 W/mK.

5. The generator of claim 3, wherein the second layer includes a member selected from the group consisting of Li, Na, K, Rb, Cs, Be, Mg, Ca, Sr, Ba, Ce, Sm, and mixtures or alloys thereof.

6. The generator of claim 1, wherein the intermediate member comprises a material having a thermal conductivity of less than about 80 W/mK and a resistivity of less than about 10 $\mu\Omega$-cm at 20° C.

7. The generator of claim 1, wherein the intermediate member comprises a material selected from the group consisting of Pb, V, Cs, Hf, Ti, Nb, Zr, Ga, and mixtures or alloys thereof.

8. The generator of claim 1, wherein the anode comprises copper.

9. The generator of claim 1, wherein the intermediate member further comprises a thermally insulating material having a plurality of apertures extending therethrough, said apertures containing a conductive metal.

10. The generator of claim 9, wherein the apertures comprise between about 10% and 40% of the intermediate member.

11. The generator of claim 1, wherein the amorphous diamond coating has a thickness of from about 10 nm to about 3 microns.

12. The generator of claim 1, wherein the cathode has a thickness of from about 0.1 micron to about 10 millimeter.

13. The generator of claim 1, wherein the intermediate member has a thickness of from about 1 micron to about 1 millimeter.

14. The generator of claim 1, further comprising an energy collector coupled to the cathode opposite the amorphous diamond material.

15. The generator of claim 1, wherein the asperity height is about 10 microns to about 100 microns.

16. The generator of claim 15, wherein the asperity has a peak density of greater than about 1 million peaks per square centimeter of emission surface.

17. The generator of claim 1, wherein the asperity height is about 100 to 1,000 nanometers.

18. The generator of claim 17, wherein the asperity has a peak density of greater than about 1 billion peaks per square centimeter of emission surface.

19. A heat source having the generator of claim 1 coupled to a surface of the heat source.

20. The heat source of claim 19, wherein the heat source is selected from the group consisting of a battery, a process unit, a CPU, a fire, and a hot plate.

21. An amorphous diamond electrical generator comprising:
   a) a cathode having a base member with a layer of amorphous diamond material coated over at least a portion thereof, said amorphous diamond material comprising at least about 90% carbon atoms with at least about 20% of said carbon atoms bonded in distorted tetrahedral coordination, said diamond coating being configured with an energy input surface in contact with the base member and an electron emission surface opposite the energy input surface, said electron emission surface having an asperity height of from about 10 to about 1,000 nanometers, and being capable of emitting electrons upon input of a sufficient amount of energy into the amorphous diamond material, said base member comprising a first layer and a second layer coupled between the first layer and the energy input surface of the amorphous diamond coating, wherein the second layer has a work function of from about 1.5 eV to about 4.0 eV and a thermal conductivity of greater than about 100 W/mK;

b) an intermediate member coupled to the electron emission surface of the amorphous diamond coating, said intermediate member comprising a material having a thermal conductivity of less than about 100 W/mK and a resistivity of less than about 80 $\mu\Omega$-cm at 20° C.; and c) an anode coupled to the intermediate member opposite the amorphous diamond coating.

22. A method of making an amorphous diamond electrical generator comprising:

a) forming a layer of amorphous diamond material on a cathode material using a physical vapor deposition technique, said amorphous diamond material comprising at least about 90% carbon atoms with at least about 20% of said carbon atoms bonded in distorted tetrahedral coordination, said diamond material being configured with an energy input surface in contact with the cathode material and an electron emission surface opposite the energy input surface, said electron emission surface having an asperity height of from about 10 to about 1,000 nanometers, and being capable of emitting electrons upon input of a sufficient amount of energy into the material;

b) forming an intermediate member on the electron emission surface of the amorphous diamond material having a thermal conductivity of less than about 100 W/mK and a resistivity of less than about 80 $\mu\Omega$-cm at 20° C.; and c) coupling an anode to a low work function material opposite the electron emission surface.

23. The method of claim 22, wherein the physical vapor deposition technique is a cathodic arc technique.

24. The method of claim 22, wherein the intermediate member is formed by sputtering or arc deposition.

25. The method of claim 22, wherein the intermediate member has a thermal conductivity of less than about 40 W/mK.

26. The method of claim 22, wherein the intermediate member has a work function of from about 2.0 to about 4.0 eV.

27. The method of claim 22, wherein the intermediate function material is a member selected from the group consisting of Pb, V, Cs, Hf, Ti, Nb, Zr, Ga, and mixtures or alloys thereof.

28. The method of claim 22, wherein the anode is coupled to the intermediate member by sputtering or arc deposition.

29. The method of claim 22, wherein the anode is coupled to the intermediate member by brazing.

30. The method of claim 22, wherein the anode comprises a material having a work function of from about 3.5 eV to about 5.0 eV.

31. The method of claim 30, wherein the anode comprises copper.

32. The method of claim 22, wherein the cathode material is formed of a first layer and a second layer coupled between the first layer and the energy input surface of the amorphous diamond coating, wherein the second layer has a work function of from about 1.5 eV to about 3.5 eV.

33. The method of claim 32, wherein the second layer comprises a material selected from the group consisting of Li, Na, K, Rb, Cs, Be, Mg, Ca, Sr, Ba, Ce, Sm, and mixtures or alloys thereof.

34. The method of claim 22, further comprising forming an energy collection layer on the cathode opposite the amorphous diamond layer.

35. The method of claim 22, further comprising heating the amorphous diamond electrical generator to a temperature of from about 350° C. to about 500° C.

36. A method of generating a current comprising providing an amorphous diamond electrical generator as in claim 1 and inputting an amount of photonic or thermal energy into the energy input surface which is sufficient to produce a current.

37. The method of claim 36, wherein at least about 50% of said carbon atoms are bonded with distorted tetrahedral coordination.

38. The method of claim 38, wherein the energy is thermal energy.

39. The method of claim 38, wherein the cathode has temperature of from about 100° C. to about 1800° C.

40. The method of claim 41, wherein the cathode has temperature of from about 300° C. to about 1800° C.

41. The method of claim 38, wherein the anode has temperature of from about 0° C. to about 100° C.

* * * * *